N. SWIGART.
Corn Planter.

No. 108,065.

Patented Oct. 4, 1870.

Witnesses:
J. H. Burridge
D. L. Humphrey

Inventor:
Nathan Swigart.
Per Burridge & Co.
Attys.

United States Patent Office.

NATHAN SWIGART, OF RICHFIELD, OHIO.

Letters Patent No. 108,065, dated October 4, 1870.

IMPROVEMENT IN CORN-PLANTERS.

The Schedule referred to in these Letters Patent and making part of the same.

Be it known that I, NATHAN SWIGART, of Richfield, in the county of Summit and State of Ohio, have invented certain new and useful Improvements in Corn-Planters, of which the following is a specification.

Nature and Object of the Invention.

This invention has for its object the planting of corn in hills, by means of a pair of rollers, in the periphery of which are seed-cups, from which the corn is dropped to the hills in regular and equal distances, as hereinafter set forth.

General Description.

Figure 1:
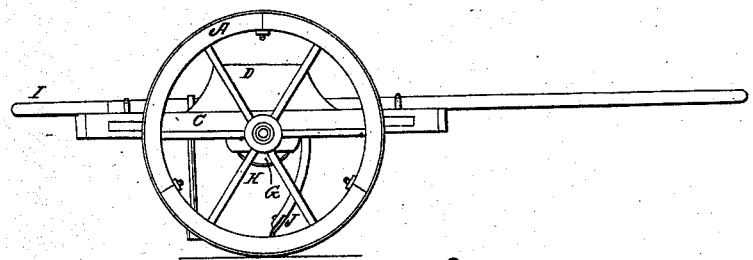
Figure 1 is a side view of the machine.
Figure 2:
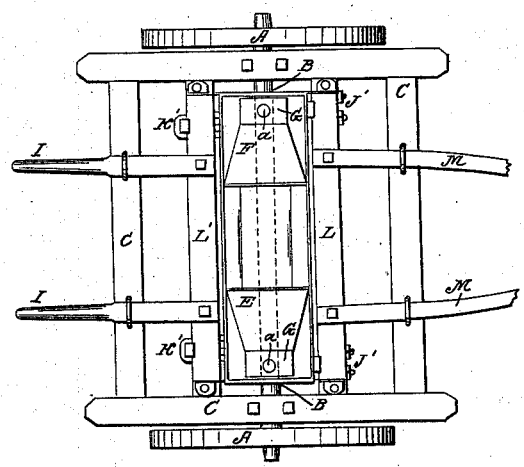
Figure 2, a view of the top.
Figure 3:
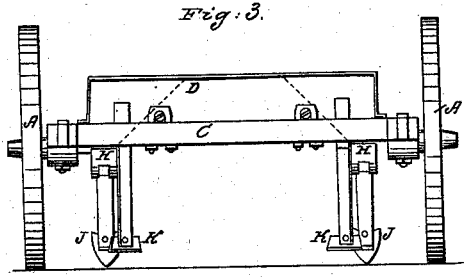
Figure 3, a view of the rear end.
Like letters of reference refer to like parts in the different views.

In the drawing, fig. 1—
A represents a pair of wheels, secured in a rigid manner to a shaft, B, on which is mounted a frame, C.
In said frame is arranged a seed-box, D, having two compartments, E F, fig. 2.
On the shaft referred to is a pair of rollers, G, so arranged in relation to the seed-boxes that their peripheries form the bottom thereof, as seen in fig. 2.
The under side of each roller is inclosed by a shield, H, having therein a slot equal in width to the seed-cups $a$, sunk in the periphery of the rollers.
Said cups in each roller are three in number, and the time of the revolution of the roller is such as to bring each cup in succession in open relation to the slot in the shield, and in direction of the ground at every four feet that the machine may move forward, which is the distance that each hill is to be planted; the distance, however, may be varied more or less by increasing or lessening the number of the seed-cups.

L L represent two cross-beams, to one of which, L, are attached the openers J by means of staple-bolts J'.
The coverers K are attached to the cross-beam L' by staple-bolts K' in the same manner, thus allowing a free vertical adjustment of the share standards.
The thills M and handles I are each, respectively, attached by a single bolt to the cross-beams L L', and by a staple-bolt to the end piece C of the rectangular frame.

Operation.

The practical operation of this machine is as follows:
The grain, on being placed in the seed-boxes, and the machine adjusted to the line of work, the operator then holds the planter by the handles I. As the machine moves forward, the rollers revolve by means of the wheels A, and, in so doing, carry the seed-cups, charged with some four or five grains of corn, around to the slot in the shield H, through which they drop from the cup into the furrow plowed by the shares J, which is immediately covered by the scrapers K following in the wake of the shares.
By this machine two rows are planted at once, at regular and equal distances apart, and each hill in the row at regular and uniform distance from the other, thereby rendering the labor of planting easy, and expeditiously performed.

Claim.

What I claim as my improvement, and desire to secure by Letters Patent, is—
The arrangement of the rectangular frame C, axle B, seed-wheels G, hoppers E F, openers J, and coverers K, with thills M and handles I, all as and for the purpose set forth.

NATHAN SWIGART.

Witnesses:
 J. H. BURRIDGE,
 D. L. HUMPHREY.